(12) United States Patent
Singh et al.

(10) Patent No.: US 11,352,300 B2
(45) Date of Patent: Jun. 7, 2022

(54) METHOD FOR DESIGNING MIXABLE SLURRIES

(71) Applicant: Halliburton Energy Services, Inc., Houston, TX (US)

(72) Inventors: John Paul Bir Singh, Kingwood, TX (US); Thomas Jason Pisklak, Cypress, TX (US); Ronnie Glen Morgan, Waurika, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 107 days.

(21) Appl. No.: 16/633,386

(22) PCT Filed: Apr. 5, 2019

(86) PCT No.: PCT/US2019/026172
§ 371 (c)(1),
(2) Date: Jan. 23, 2020

(87) PCT Pub. No.: WO2020/204955
PCT Pub. Date: Oct. 8, 2020

(65) Prior Publication Data
US 2021/0171407 A1    Jun. 10, 2021

(51) Int. Cl.
*C04B 40/00* (2006.01)
*C04B 28/02* (2006.01)
(Continued)

(52) U.S. Cl.
CPC .......... *C04B 40/0032* (2013.01); *C04B 28/02* (2013.01); *C04B 40/0042* (2013.01); *C09K 8/46* (2013.01); *E21B 33/13* (2013.01)

(58) Field of Classification Search
CPC . C04B 40/0032; C04B 28/02; C04B 40/0042; C09K 8/46; E21B 33/13
See application file for complete search history.

(56) References Cited

U.S. PATENT DOCUMENTS 4,370,166 A * 1/1983 Powers .................... C09K 8/46
106/676
4,674,574 A * 6/1987 Savoly .................... C04B 24/16
106/719

(Continued)

FOREIGN PATENT DOCUMENTS

| WO | 2018156123 | 8/2018 | |
| WO | WO-2018156115 A1 * | 8/2018 | ......... C04B 40/0032 |
| WO | WO-2018156123 A1 * | 8/2018 | ............... C09K 8/42 |

OTHER PUBLICATIONS

ISRWO International Search Report and Written Opinion for PCT/US2019/026172 dated Jan. 6, 2020.
PCT Application No. PCT/US2017/018930 dated Feb. 22, 2017.

*Primary Examiner* — Crystal J. Lee
(74) *Attorney, Agent, or Firm* — Thomas Rooney; C. Tumey Law Group PLLC (57) ABSTRACT

A method of determining slurry mixability may include: providing a dry blend comprising one or more particulate materials; calculating a minimum water requirement of the dry blend; calculating a water requirement of a slurry having a target slurry density and comprising the dry blend; determining if the slurry is mixable based on the water requirement of the slurry and the minimum water requirement; and preparing the slurry if the slurry is mixable.

20 Claims, 6 Drawing Sheets

(51) Int. Cl.
  *C09K 8/46* (2006.01)
  *E21B 33/13* (2006.01)

(56) References Cited

U.S. PATENT DOCUMENTS

| | | |
|---|---|---|
| 2010/0081733 A1 | 4/2010 | Michaux et al. |
| 2010/0212892 A1* | 8/2010 | Santra .................... C04B 28/32 |
| | | 166/250.14 |
| 2015/0321953 A1 | 11/2015 | Porcherie |
| 2017/0198547 A1* | 7/2017 | Goel ....................... B28C 7/024 |
| 2017/0364607 A1* | 12/2017 | Kaushik ................. G16C 60/00 |

* cited by examiner

METHOD FOR DESIGNING MIXABLE SLURRIES

BACKGROUND

In well cementing, such as well construction and remedial cementing, cement slurries are commonly utilized. Cement slurries may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement slurry may be pumped into an annulus between the walls of the well bore and the exterior surface of the pipe string disposed therein. The cement slurry may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement slurries also may be used in remedial cementing methods, for example, to seal cracks or holes in pipe strings or cement sheaths, to seal highly permeable formation zones or fractures, to place a cement plug, and the like.

A particular challenge in well cementing is the development of satisfactory mechanical properties in a cement slurry within a reasonable time period after placement in the subterranean formation. Oftentimes several cement slurries with varying additives are tested to see if they meet the material engineering requirements for a particular well. The process of selecting the components of the cement slurry are usually done by a best guess approach by utilizing previous slurries and modifying them until a satisfactory solution is reached. The process may be time consuming and the resulting slurry may be relatively complex. Furthermore, the cement components available in any one particular region may vary in slurry from those of another region thereby further complicating the process of selecting a correct slurry.

BRIEF DESCRIPTION OF THE DRAWINGS

These drawings illustrate certain aspects of some of the embodiments of the present disclosure and should not be used to limit or define the disclosure.

DETAILED DESCRIPTION

The present disclosure may generally relate to cementing methods and systems. Provided herein are methods of predicting mixability of cement slurries. A typical cement slurry may include solid cementitious components such as Portland cement, fly ash, pozzolans, and the like, as well as cement additives and water, for example.

Water requirement is defined as the minimum quantity of water required to hydrate a quantity of solid particulate material. A cement slurry including solid particulate materials and water therefore has a minimum amount of water per unit mass of the solid particulate materials at which the solid particulate materials and water can be blended together to form the cement slurry. As used herein, solid particulate material or particulate material means any component of a cement slurry that is not water. When the minimum amount of water is present, the cement slurry may be referred to as "mixable." Additionally, since dry components in the cement slurry are generally denser than water, a cement slurry that is blended with the minimum quantity of water per unit mass of dry components is usually the highest density at which the cement slurry can be prepared.

A cement slurry may be prepared with water that is in excess of the water requirement up to the point where the cement slurry becomes unstable, also referred to as the upper limit of stability. A cement slurry may become unstable when water is present in an amount that exceeds the maximum sorption capabilities of the dry components of the cement slurry. Unstable cement slurries may be characterized by phase separation of water from the bulk cement slurry. The upper limit of stability may also be the minimum stable density the cement slurry may be mixed to as water is generally less dense than dry components of the cement slurry.

The term mixability or alternatively, mixable, refers to the ability of the components comprising a cement slurry to blend to form the cement slurry and may be associated with the minimum water requirement of the dry components. The term stability or alternatively, stable, refers to the ability of the components comprising the cement slurry remain in a slurry once blended and may be associated with the upper limit of stability. The American Petroleum Institute (API) publishes industry guideline standards for determining whether a cement slurry is mixable and stable. The API guidelines allow one of ordinary skill in the art to determine if a cement slurry is mixable and stable by performing standardized laboratory tests on the cement slurry.

In some mixability tests, the API recommends specifications and practices for mixing a specific volume of neat cement slurry (i.e. a slurry without dispersing or water extending additives) at certain speeds for certain periods of time to determine if a slurry is mixable. Additives may then be incorporated into the cement slurry and the cement slurry may be re-tested, for example. Some particular cement slurry tests to determine mixability may be found in API RP 10B published on Dec. 1, 1997. One of ordinary skill in the art would be able to perform a mixability test on a cement slurry and determine if the cement slurry is mixable according to API RP 10B. In some stability tests, the API recommends specifications and practices for mixing a specific volume of neat cement slurry (i.e. a slurry without dispersing or water extending additives) at certain speeds for certain periods of time and then placing the neat cement slurry in a container of specified volume. The cement slurry may be observed and a measure of water that phase separates may be measured. Some variants of the stability tests may include performing the tests at elevated temperatures or placing the container at specified angels. Additives may then be incorporated into the cement slurry and the cement slurry may be re-tested, for example. Some particular cement slurry tests to determine stability may be found in API RP 10B published on Dec. 1, 1997. One of ordinary skill in the art would be able to perform a mixability test or a stability test on a cement slurry and determine if the cement slurry is mixable and stable according to API RP 10B.

A cement slurry prepared with too little or too much water may not set to form a hardened mass with satisfactory physical properties. If placed in a subterranean well, such a cement may fail over time resulting in cracks or micro annuli forming between the casing and cement sheath or between the cement sheath and the subterranean formation. The cracks or micro annuli may allow fluid invasion therein which may require remediation. In extreme cases the cement may fail in a manner leading to a loss of well control. In the case of excess water and free water separation, fluid separation may occur at the top of the cement column or in pockets in deviated (e.g. horizontal) wells. In the case of unconventional long horizontal wells, such as but not limited to lengths exceeding 1,000 ft (304 m), such cement slurries may become unstable resulting in separation of the cement slurry components resulting a non-homogeneous mixture characterized by free water and an uneven distribution of particulate content. Uneven particulate distribution may result in the particles settling and thus potentially plugging off most or all of the annular cross section, resulting in excessive pumping pressure at the surface. This ultimately results in not being able to complete the cement slurry placement, and hence leaving large portions of the targeted annular space without adequate isolation. These pockets may contribute to annular gas leakage and other annular flow problems. Furthermore, large amounts of free water in a deviated well might lead to a communication channel on the high side in the well bore. These channels may cause gas inflows or undesirable cross flows into the well. If such conditions are allowed to persist, a buildup of annulus pressure may occur resulting in an operating condition which may require intervention. Furthermore, pockets in the cement sheath may present a point of increased casing corrosion which may lead to holes in the casing, casing collapse, loss of well control, and/or abandonment of the well.

A design parameter for a cement slurry may be slurry density. Correct slurry density may be required to ensure that hydrostatic control may be retained throughout the cementing operation. One common method to adjust density of the cement slurry may be to mix the cement slurry with relatively more or relatively less water. Increasing water content of a slurry may reduce the density of the cement slurry while reducing the water content of a cement slurry may increase the density of the cement slurry. However, as discussed above, water content may determine if the cement slurry is mixable and if the cement slurry will set with the required physical properties.

For these and other reasons, mixability of a cement slurry may be a concern when designing a wellbore cement slurry. Cement additives such as dispersants, free water additives, and suspension additives may be added to the cement slurry to increase the mixability range of the cement slurry. Dispersants may allow the cement slurry to be mixable with relatively less water whereas free water additives and suspension additives may allow cement slurries to be mixed with relatively more water. Free water additives may include natural or synthetic water absorbing polymers which may absorb and/or uptake water. However, these additives may add complexity to cement slurries and complexities in preparing the cement slurry at a wellbore location. Furthermore, there may be undesirable properties associated with some additives such as retarding properties that prevent the cement from setting and reaching an optimal compressive strength.

Conventional methods to estimate if a particular cement slurry is mixable may include a trial and error method in a laboratory using the methods published by API, for example. A method may include mixing a first cement slurry and observing if the slurry is mixable. Several more slurries may be prepared by adjusting the slurry of the first cement slurry to generate a plurality of slurries with varying slurries which are each tested for mixability. The trial and error method of mixability testing may result in many slurries being tested before a slurry that is mixable is found. Furthermore, the trial and error method may result in a slurry that is mixable and has the desired mechanical properties but may contain large amounts of additives which may increase the complexity of mixing and increase the complexity of the slurry. There may be various degrees of mixability such as, for example, unmixable, mixable, or partially mixable. An unmixable slurry may be a slurry where there is not enough water present to wet all components in the slurry. A mixable slurry may be a slurry where there not enough water present to wet all components in the slurry. A partially mixable slurry may be where only a portion of the components in the slurry are wetted.

Mixability of a cement slurry may be a function of water requirement for each component of the cement slurry. Water requirement of each material may be defined as the amount of mixing water that is required to be added to a powdered, solid material to form a slurry of a specified consistency. The consistency may vary for a particular application. This water requirement of a material is an intrinsic property and may depend on various factors including, but not limited to particle size and distribution, shape, porosity, surface charge and specific gravity of the material. This water requirement of a material may be distinguished from the water requirement of a cement slurry which is purely the amount of water needed to be mixed with unit mass of cement to achieve a certain target slurry density. The following example technique for determining water requirement holds the consistency and amount of water constant while varying the amount of the solid material. However, techniques may also be applied that vary the amount of the water, the consistency, and/or the amount of solid material in any combination. The following technique also estimates the specified consistency based on the size of the vortex at the surface of the mixture in the blender. Water requirement for a particular cement component may be determined by a process that includes a) preparing a blender (e.g., Waring® blender) with a specified amount of water (e.g., about 100 grams to about 500 grams), b) agitating the water at a specified blender rpm (e.g., 4,000 to 15,000 rpm), c) adding the powdered solid that is being investigated to the water until a specified consistency is obtained, and d) calculating the water requirement based on the ratio of water to solids required to obtain the desired consistency. A specific example for determining water requirement may include, but is not limited to: 1) preparing a blender (e.g., Waring® blender) with a specified amount of water (e.g., about 100 grams to about 500 grams or about 200 grams in one example); 2) agitating the water at a specified blender rpm (e.g., about 4,000 to about 15,000 rpm or about 12,000 rpm in one example); 3) adding a specified amount (e.g., about 1 gram to about 1,000 grams or about 400 grams in one example) of the cement component to the water; 4) observing mixture to determine if a specified consistency is obtained, for example, the cement component can be considered thoroughly wet and mixed if the vortex formed at the surface of the mixture in the blender is about 0 inches (0 mm) to about 2 inch (50 mm) or about 0.004 inches (0.1 mm) to about 1 inch (25 mm); 5) if the desired consistency is not obtained, add more cement component until desired consistency is obtained, for example, the vortex formed in the blender is about the size of a dime; and 6) calculate the water requirement based on the ratio of water to cement component to obtain the desired consistency. In some examples, the specific consistency may be where a vortex at the surface of the mixture in the blender is the size of a dime or about 0.7 in (17.9 mm). Table 1 illustrates an example of water requirement for some samples expressed as a weight of water required.

Water requirement may be defined for any materials present in a cement slurry such as materials that dissolve as well as materials that do not dissolve. Some dissolvable materials may be solvated by water or by chemical reaction with water or other chemical species present in the slurry and thereafter be solvated. Some common dissolvable materials may include cementitious materials, fluid loss additives, polymers, gums, and other cement components that are well known in the art. Additionally, materials that do not dissolve, such as plastic beads for example, may also exhibit a water requirement. Water requirement may be positive water requirement or negative water requirement. In the instance of a positive water requirement, the particular material requires water to be present to hydrate. An example of a material with a positive water requirement is Portland class H cement. Pure Portland class H cement without additives requires addition of water to become a cement slurry capable of setting to form a hardened mass. Superplasticizers such as polycarboxylate ether dispersants may have a negative water requirement in that a polycarboxylate ether dispersant may reduce the water requirement that a Portland class H cement requires to become mixable.

TABLE 1

| Material Name | Water Requirement (%) |
|---|---|
| Natural Glass A | 60 |
| Natural Glass B | 58 |
| Pozzolan Mix | 28 |
| Natural Glass C | 59 |
| Hydrated Lime | 131 |
| Silicalite | 136 |
| Metakaolin | 101 |
| Portland Class H | 44 |

The water requirements in Table 1 are listed as the water requirement as a mass of water compared the mass of the material. For Portland Class H cement for example, 1 kg of cement may require 440 grams of water to be mixable by the definition of mixability previously defined. As illustrated in Table 1, water requirement may vary between materials that have the same chemical identity. For example, Natural Glass A has a water requirement of 60% by weight, while Natural Glass B has a water requirement of 58% by weight. The difference in water requirements may be caused by many factors including minerology and origin of the material. For a given dry cement composition, the minimum water requirement, or water required to wet all particulate materials, may be calculated by a linear combination of the mass fraction of each component and the water requirement of each component in the dry cement composition by Equation (1). Dry cement composition, particulate materials, dry blend may refer to the components of a cement slurry other than cement additives and water.

$$WR_{Blend} = \Sigma M_i WR_i \quad (1)$$

Where $WR_{Blend}$ is the minimum water requirement expressed as mass of water per unit mass of dry cement required to hydrate all particles of the dry blend. Mi is the mass fraction or mass of component i in the cement composition and $WR_i$ is the water requirement of component i in the cement composition. $WR_{Blend}$ may also be expressed in units of volume by converting mass to volume by water density.

In some examples, there may be synergistic effects between the components of the cement composition when blended to a slurry. Some effects may reduce the water requirement of the blend while some effects may increase the water requirement of the blend. These synergistic mixing effects may be expressed by a non-linear equation such as Equation (2).

$$WR_{Blend} = \Sigma(M_i WR_i)^{B_i} \quad (2)$$

Where $WR_{Blend}$ is the total mass of water required per unit mass of the dry cement composition, Mi is the mass fraction or mass of component i in the cement composition, $WR_i$ is the water requirement of component i in the cement composition, and $B_i$ is a material constant for component i. The material constant may be a measured property that may be acquired by laboratory analysis. For example, water requirements of individual materials and combinations of materials may be measured. A curve fitting scheme such as multivariate analysis or stepwise regression, for example, may then be applied to find $B_i$. As previously discussed, water may be used to adjust the density of a cement slurry to meet the density requirements for a particular cementing application. For a given cement composition and density, the required amount of water to achieve the density may be readily calculated from Equation (3).

$$\rho\left(\frac{mass}{vol}\right) = \frac{(\text{mass of dry cement composition} + \text{mass of water})}{(\text{volume of dry cement composition} + \text{volume of water})} \quad (3)$$

Where $\rho_{slurry}$ is the slurry density, $W_i$ mass of component i in the cement composition, $v_i$ is the specific volume of component i, $\rho_{H2O}$ is the density of water, and $WR_{slurry}$ is the mass of water required per unit mass of the particulate cement blend to achieve a target slurry density.

Alternatively, Equation (3) may be expressed based on a unit mass of the dry cement blend as follows:

$$\rho_{slurry} = \frac{1 + WRslurry}{\Sigma(1 * M_i v_i) + WRslurry} \quad (4)$$

In Equation 4, all variables are known except the water requirement of the slurry ($WR_{slurry}$). In general, to have a cement slurry that is mixable, the minimum water requirement of the dry cement composition $WR_{Blend}$ calculated by Equation (1) or Equation (2) should be less than the water requirement of the slurry $WR_{Slurry}$, calculated from Equation (3). If this condition is not met, there is not enough water to wet the particles in the slurry and the slurry may not be mixable. As with $WR_{Blend}$, $WR_{Slurry}$ may be readily converted to volume through water density.

As discussed above, a cement slurry prepared with a water volume over the water volume requirement of the particular cement dry blend may lead to a layer of water, sometimes referred to as free water or free fluid, to form on the cement slurry. A cement slurry where a free water layer is formed may be referred to as an unstable slurry. Although the formation of a free fluid may generally be undesirable, each section of a wellbore to be cemented may have an acceptable amount of free fluid formation either defined by regulation, economics, or customer specification, for example. The maximum water requirement ($WR_{Max}$) is therefore typically provided as a design parameter that does not necessarily need to be calculated for the particular wellbore section to be cemented. For example, in a conductor casing or a surface casing cement, a relatively larger amount of free fluid may be allowed as compared to a horizontal casing cement. In some applications, no amount of free water may be present. The maximum water requirement may be on the order of about 2.5 to about 10 times the $WR_{Blend}$ in some applications.

The relationship between $WR_{Slurry}$, $WR_{Blend}$, and $WR_{Max}$ is illustrated in Equation (5). $WR_{Slurry}$ must fall between the minimum water requirement, $WR_{Blend}$, and the maximum water requirement, $WR_{Max}$, to form a slurry that is mixable and stable.

$$WR_{Blend} < WR_{Slurry} < WR_{Max} \quad (5)$$

For a given dry cement composition $WR_{Blend}$, and $WR_{Max}$ a minimum stable slurry density and a maximum stable slurry density may be calculated from water requirement of materials in the dry cement composition.

$WR_{Blend}$, and $WR_{Max}$ may be calculated based on a unit mass of dry cement composition as in Equations 6 and 7.

$$\rho_{min} = \frac{1 + \rho_{H2O} WR_{Blend}}{\Sigma(1 * M_i v_i) + WR_{Blend}} \quad (6)$$

$$\rho_{max} = \frac{1 + \rho_{H2O} WR_{Blend}}{\Sigma(1 * M_i v_i) + WR_{Max}} \quad (7)$$

Once $WR_{Slurry}$, $WR_{Blend}$, and $WR_{Max}$ are calculated, $WR_{Slurry}$ may be compared to $WR_{Blend}$ and $WR_{Max}$ and to see if a dispersant, suspension additive, or free water additive may be included in the cement composition to form a mixable and/or stable slurry. If $WR_{Slurry}$ is less than $WR_{Blend}$, the slurry may not be mixable and a dispersant may be included in the slurry. If $WR_{Slurry}$ is greater than $WR_{Max}$, the slurry may be mixable but a free water layer may separate from the slurry. In alternate embodiments, if $WR_{Slurry}$ is less than $WR_{Blend}$, the cement slurry may be adjusted to include less of a component with a relatively higher water requirement thereby reducing $WR_{Blend}$. If $WR_{Slurry}$ is greater than $WR_{Max}$, the cement slurry may be adjusted to include more of a component with a relatively higher water requirement thereby increasing $WR_{Max}$. In alternate embodiments, $WR_{Slurry}$ may be compared to $WR_{Blend}$ and $WR_{Max}$ by fractional difference, difference between $WR_{Slurry}$, $WR_{Blend}$, and $WR_{Max}$, and/or absolute difference.

The cement slurries may have a density suitable for a particular application. The cement slurries may have a density in the range of about 7 pounds per gallon ("ppg") (840 kg/m$^3$) to about 23 ppg (2760 kg/m$^3$). In the foamed examples, the foamed cement slurries may have a density in the range of about 7 ppg to about 15 ppg (or even lower).

The water used in the cement slurries may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the cement slurry. The water may be included in an amount sufficient to form a pumpable slurry. The water may be included in the cement slurries in the range of about 40% to about 200% by weight of the cement composition ("bwoc"). In some examples, the water may be included in an amount in the range of about 40% to about 150% bwoc.

A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include Portland cements, gypsum, and high alumina content cements, among others. Portland cements that are suited for use in the present disclosure may be classified as Classes A, C, G, and H cements according to American Petroleum Institute, API Specification for Materials and Testing for Well Cements, API Specification 10, Fifth Ed., Jul. 1, 1990. In addition, in some examples, Portland cements suitable may be classified as ASTM Type I, II, III, I/II, II/V and V. Cement slurries that may be considered "low Portland" may be designed by use of the techniques disclosed herein.

Where present, the hydraulic cement generally may be included in the cement slurries in an amount sufficient to provide the desired compressive strength and/or density. The hydraulic cement may be present in the cement slurries in any suitable concentration, including in an amount in the range of about 0% to about 99% bwoc. The hydraulic cement may be present in an amount ranging between any of and/or including any of about 1%, about 5%, about 10%, about 20%, about 40%, about 60%, about 80%, or about 90% bwoc. The cement component may be considered "low Portland" in that the Portland cement (where used) may be present in the cement slurry in an amount of about 40% or less bwoc and, alternatively, about 10% or less. Cement slurries may also be designed that are free (or essentially free) of Portland cement.

In addition to Portland cement, additional cement components may be used that can be considered alkali soluble. A cement component is considered alkali soluble where it is at least partially soluble in an aqueous solution of pH 7.0 or greater. Certain of the alkali soluble cement components may include a geopolymer cement, which may include an aluminosilicate source, a metal silicate source, and an activator. The geopolymer cement may react to form a geopolymer. A geopolymer is an inorganic polymer that forms long-range, covalently bonded, non-crystalline networks. Geopolymers may be formed by chemical dissolution and subsequent re-condensation of various aluminosilicates and silicates to form a 3D-network or three-dimensional mineral polymer. The activator may include, but is not limited to, metal hydroxides chloride salts such as KCl, CaCl$_2$, NaCl, carbonates such as Na$_2$CO$_3$, silicates such as sodium silicate, aluminates such as sodium aluminate, and ammonium hydroxide. The aluminosilicate source may include any suitable aluminosilicate. Aluminosilicate can be minerals comprising aluminum, silicon, and oxygen, plus countercations. There are potentially hundreds of suitable minerals that may be an aluminosilicate source in that they may include aluminosilicate minerals. Each aluminosilicate source may potentially be used in a particular case if the specific properties, such as composition, may be known. Some minerals such as andalusite, kyanite, and sillimanite are naturally occurring aluminosilicate sources that have the same composition, $Al_2SiO_5$, but differ in crystal structure. Each mineral andalusite, kyanite, or sillimanite may react more or less quickly and to different extents at the same temperature and pressure due to the differing crystal structures. Other suitable aluminosilicate sources may include, but are not limited to, calcined clays, partially calcined clays, kaolinite clays, lateritic clays, illite clays, natural glasses, mine tailings, blast furnace slag, and coal fly ash. The metal silicate source may include any suitable metal silicate. A silicate is a compound containing an anionic silicon compound. Some examples of a silicate include the orthosilicate anion also known as silicon tetroxide anion, $SiO_4^{4-}$ as well as hexafluorosilicate $[SiF_6]^{2-}$. Other common silicates include cyclic and single chain silicates which may have the general formula $[SiO_{2+n}]^{2n-}$ and sheet-forming silicates $([SiO_{2.5}]^-)_n$. Each silicate example may have one or more metal cations associated with each silicate molecule. Some suitable metal silicate sources and may include, without limitation, sodium silicate, magnesium silicate, and potassium silicate.

Where present, the geopolymer cement generally may be included in the cement slurries in an amount sufficient to provide the desired compressive strength and/or density. The geopolymer cement may be present in the cement slurries in any suitable concentration, including an amount in the range of about 0% to about 99% bwoc. The geopolymer cement may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of geopolymer cement for a particular application.

Additional cement components that are alkali soluble may include a silica source. The silica source may be any suitable material that provides silica to the cement slurry. By inclusion of the silica source, a different path may be used to arrive at a similar product as from Portland cement. A pozzolanic reaction may be induced wherein silicic acid ($H_4SiO_4$) and portlandite ($Ca(OH)_2$ react to form a cement product (calcium silicate hydrate). If other compounds, such as, aluminate, are present in the silica source, additional reactions may occur to form additional cement products, such as calcium aluminate hydrates. Calcium hydroxide necessary for the reaction may be provide from other cement components, such as Portland cement, or may be separately added to the cement slurry. Examples of suitable silica sources may include fly ash, slag, silica fume, crystalline silica, silica flour, cement kiln dust ("CKD"), natural glasses, metakaolin, diatomaceous earth, zeolite, shale, and agricultural waste ash (e.g., rice husk ash, sugar cane ash, and bagasse ash), among other. Some specific examples of the silica source will be discussed in more detail below. Where present, the silica source generally may be included in the cement slurries in an amount sufficient to provide the desired compressive strength and/or density. The silica source may be present in the cement slurries in any suitable concentration, including in an amount in the range of about 0% to about 99% bwoc. The silica source may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of silica source for a particular application.

An example of a suitable silica source may include fly ash. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash includes both silica and lime, so it may set to form a hardened mass upon mixing with water. Class F fly ash generally does not contain a sufficient amount of lime to induce a cementitious reaction, therefore, an additional source of calcium ions is necessary for a set-delayed cement slurry comprising Class F fly ash. Where used, lime may be mixed with Class F fly ash in any suitable amount, including in an amount in the range of about 0.1% to about 100% by weight of the fly ash. In some instances, the lime may be hydrated lime. Suitable examples of fly ash include, but are not limited to, POZMIX® A cement additive, commercially available from Halliburton Energy Services, Inc., Houston, Tex.

Another example of a suitable silica source may include slag. Slag is generally a by-product in the production of various metals from their corresponding ores. By way of example, the production of cast iron can produce slag as a granulated, blast furnace by-product with the slag generally comprising the oxidized impurities found in iron ore. Slag generally does not contain sufficient basic material, so slag cement may be used that further may include a base to produce a settable composition that may react with water to set to form a hardened mass. Examples of suitable sources of bases include, but are not limited to, sodium hydroxide, sodium bicarbonate, sodium carbonate, lime, and combinations thereof.

Another example of a suitable silica source may include CKD. Cement kin dust or "CKD", as that term is used herein, refers to a partially calcined kiln feed which is removed from the gas stream and collected, for example, in a dust collector during the manufacture of cement. Usually, large quantities of CKD are collected in the production of cement that are commonly disposed of as waste. CKD is another component that may be included in examples of the cement slurries.

Another example of a suitable silica source may include natural glass. Certain natural glasses can exhibit cementitious properties, in that they may set and harden in the presence of hydrated lime and water. The natural glass may also be ground, for example. Generally, the natural glass may have any particle size distribution as desired for a particular application. In certain embodiments, the natural glass may have a mean particle size in a range of from about 1 micron to about 200 microns. The mean particle size corresponds to d50 values as measured by particle size analyzers such as those manufactured by Malvern Instruments, Worcestershire, United Kingdom. One of ordinary skill in the art, with the benefit of this disclosure, should be able to select a particle size for the natural glass suitable for use for a chosen application.

Another example of a suitable silica source may include metakaolin. Generally, metakaolin is a white pozzolan that may be prepared by heating kaolin clay, for example, to temperatures in the range of about 600° to about 800° C.

Another example of a suitable silica source may include shale. Among other things, shale included in the cement slurries may react with excess lime to form a suitable cementing material, for example, calcium silicate hydrate. A variety of shales are suitable, including those comprising silicon, aluminum, calcium, and/or magnesium. An example of a suitable shale includes vitrified shale. Generally, the shale may have any particle size distribution as desired for a particular application. In certain embodiments, the shale may have a particle size distribution in the range of about 37 micrometers to about 4,750 micrometers.

Another example of a suitable silica source may include zeolite. Zeolites generally are porous alumino-silicate minerals that may be either a natural or synthetic material. Synthetic zeolites are based on the same type of structural cell as natural zeolites, and may include aluminosilicate hydrates. As used herein, the term "zeolite" refers to all natural and synthetic forms of zeolite. Examples of zeolites may include, without limitation, mordenite, zsm-5, zeolite x, zeolite y, zeolite a, etc. Furthermore, examples comprising zeolite may include zeolite in combination with a cation such as $Na^+$, $K^+$, $Ca^{2+}$, $Mg^{2+}$, etc. Zeolites comprising cations such as sodium may also provide additional cation sources to the cement slurry as the zeolites dissolve.

The cement slurries may further include hydrated lime. As used herein, the term "hydrated lime" will be understood to mean calcium hydroxide. In some examples, the hydrated lime may be provided as quicklime (calcium oxide) which hydrates when mixed with water to form the hydrated lime. The hydrated lime may be included in examples of the cement slurries, for example, to form a hydraulic composition with the silica source. The hydrated lime may be included in any suitable concentration, including, but not limited to, in a silica source-to-hydrated-lime weight ratio of about 10:1 to about 1:1 or a ratio of about 3:1 to about 5:1. Where present, the hydrated lime may be included in the cement slurries in an amount in the range of from about 10% to about 100% by weight of the silica source, for example. The hydrated lime may be present in an amount ranging between any of and/or including any of about 10%, about 20%, about 40%, about 60%, about 80%, or about 100% by weight of the silica source. One of ordinary skill in the art, with the benefit of this disclosure, would recognize the appropriate amount of hydrated lime to include for a chosen application.

The cement slurries may also include a calcium source other than hydrated lime, which may be used in addition, or in place of the hydrated lime. In general, calcium and a high pH, for example a pH of 7.0 or greater, may be needed for certain cementitious reactions to occur. A potential advantage of hydrated lime may be that calcium ions and hydroxide ions are supplied in the same molecule. In another example, the calcium source may be $Ca(NO_3)_2$ or $CaCl_2$ with the hydroxide being supplied form NaOH or KOH, for example. The alternate calcium source and hydroxide source may be included in a cement slurry in the same way as hydrated lime. For example, the calcium source and hydroxide source may be included in any suitable amount, including, but not limited to, a silica source-to-hydrated-lime weight ratio of about 10:1 to about 1:1 or a ratio of about 3:1 to about 5:1. Where present, the alternate calcium source and hydroxide source may be included in the cement slurries in an amount in the range of from about 10% to about 100% by weight of the silica source, for example. The alternate calcium source and hydroxide source may be present in an amount ranging between any of and/or including any of about 10%, about 20%, about 40%, about 60%, about 80%, or about 100% by weight of the silica source. One of ordinary skill in the art, with the benefit of this disclosure, would recognize the appropriate amount of alternate calcium source and hydroxide source to include for a chosen application.

Other additives suitable for use in cementing operations also may be included in the cement slurries as needed for a particular application. Examples of such additives include, but are not limited to: weighting agents, activators, lightweight additives, gas-generating additives, mechanical-property-enhancing additives, lost-circulation materials, filtration-control additives, fluid-loss-control additives, defoaming agents, foaming agents, dispersants, thixotropic additives, and combinations thereof. One of ordinary skill in the art, with the benefit of this disclosure, would be able to select an appropriate additive for a particular application.

Figure 1:
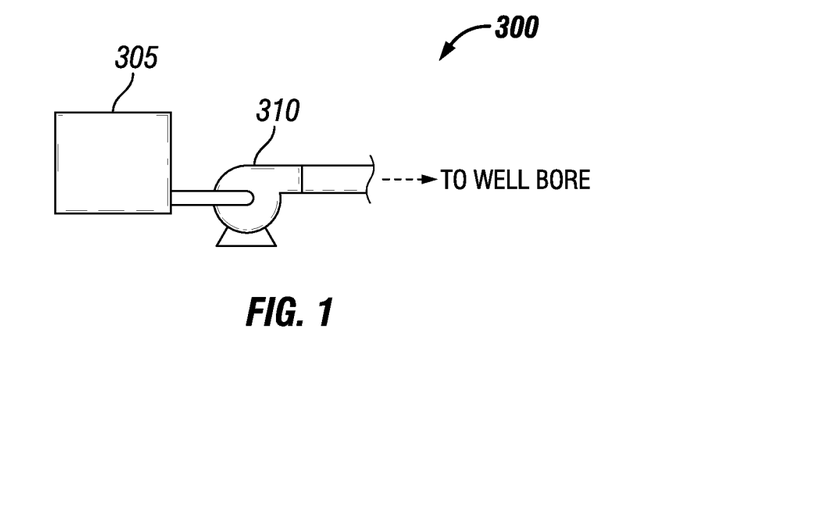
FIG. 1 is a schematic illustration of an example system for the preparation and delivery of a cement slurry into a wellbore.

Example methods of using the cement slurries will now be described in more detail with reference to FIGS. 1-5. Any of the previous examples of the cement slurries may apply in the context of FIGS. 1-5. Referring now to FIG. 1, the preparation of a cement slurry in accordance with examples will now be described. FIG. 1 illustrates a system 300 for the preparation of a cement slurry and subsequent delivery of the cement slurry to a wellbore in accordance with certain examples. As shown, the cement slurry may be mixed in mixing equipment 305, such as a jet mixer, re-circulating mixer, or a batch mixer, for example, and then pumped via pumping equipment 310 to the wellbore. In some examples, the mixing equipment 305 and the pumping equipment 310 may be disposed on one or more cement trucks. If a cement slurry is to be used, a bulk dry cement may be preformulated and prepared at a bulk cement plant, for example. A cement slurry may be mixed by combing the bulk dry cement in mixing equipment 305 or in other mixing equipment. Liquid additives may be blended with the cement slurry in mixing equipment 305. Pumping equipment 310 may pump the cement slurry to the wellbore.

Figure 2:
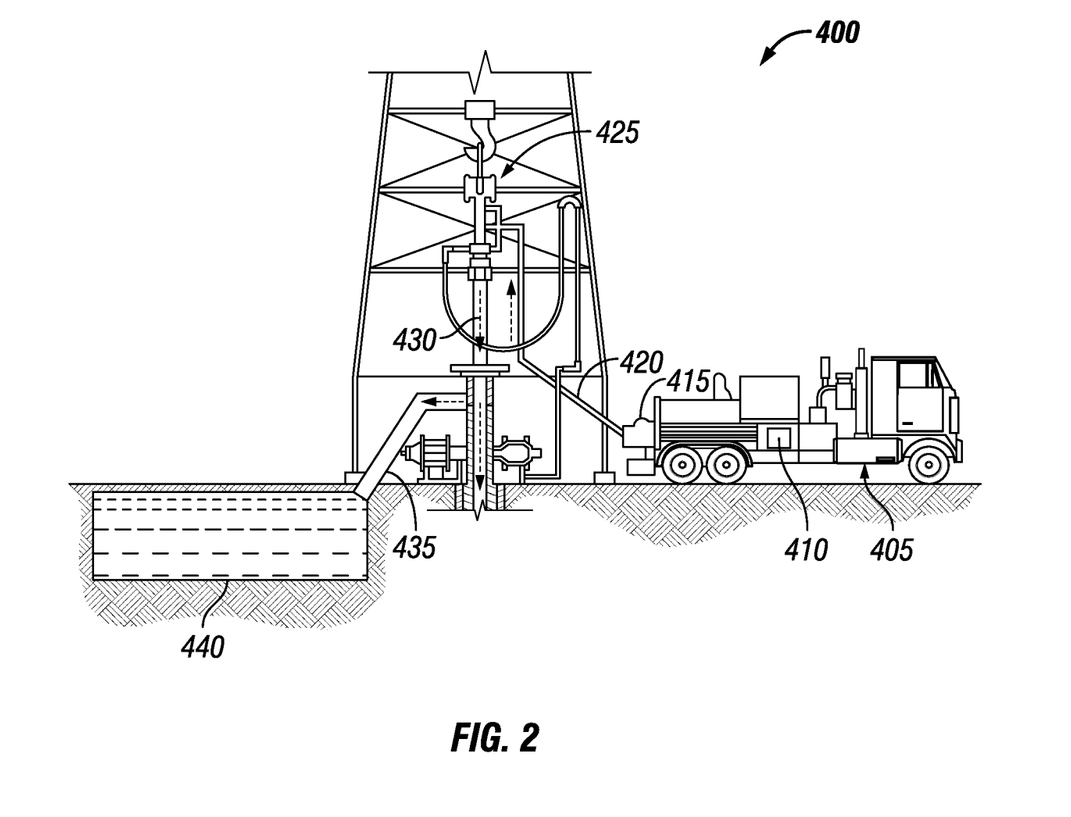
FIG. 2 is a schematic illustration of example surface equipment that may be used in the placement of a cement slurry into a wellbore.

An example primary cementing technique using a cement slurry will now be described with reference to FIGS. 2 and 3. FIG. 2 illustrates surface equipment 400 that may be used in the placement of a cement slurry in accordance with certain examples. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 400 may include a cementing unit 405, which may include one or more cement trucks. The cementing unit 405 may include mixing equipment 410 and pumping equipment 415 (e.g., FIG. 2). Cementing unit 405, or multiple cementing units 405, may pump a cement slurry 430 through a feed pipe 430 and to a cementing head 425 which conveys the cement slurry 420 downhole. Cement slurry 420 may displace other fluids present in the wellbore, such as drilling fluids and spacer fluids, which may exit the wellbore through an annulus and flow through pipe 435 to mud pit 440.

Figure 3:
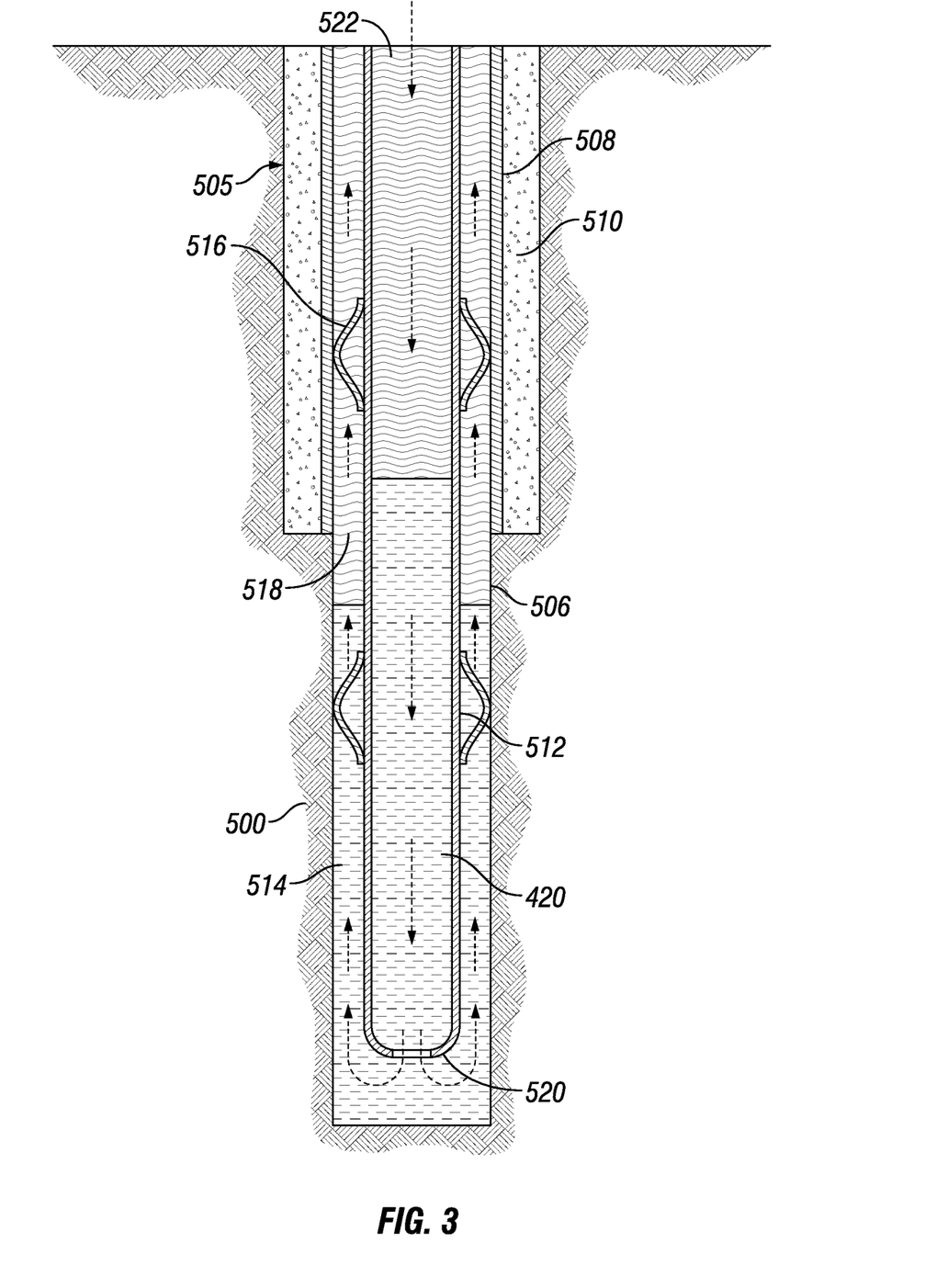
FIG. 3 is a schematic illustration of an example in which a cement slurry is used in a primary cementing application.

FIG. 3 generally depicts the placement of cement slurry 420 into a subterranean formation 500 in accordance with example examples. As illustrated, a wellbore 505 may be drilled into the subterranean formation 500. While wellbore 505 is shown extending generally vertically into the subterranean formation 500, the principles described herein are also applicable to wellbores that extend at an angle through the subterranean formation 500, such as horizontal and slanted wellbores. As illustrated, the wellbore 505 includes walls 506. In the illustrated example, a surface casing 508 has been inserted into the wellbore 505. The surface casing 508 may be cemented in the wellbore 505 by a cement sheath 510. In alternative examples, surface casing 508 may be secured in the wellbore 505 by a hardened resin or hardened resin-cement composite sheath in place of cement sheath 510. In the illustrated example, one or more additional conduits (e.g., intermediate casing, production casing, liners, etc.), shown here as casing 512 may also be disposed in the wellbore 505. As illustrated, there is a wellbore annulus 514 formed between the casing 512 and the walls 506 of the wellbore 505 and/or the surface casing 508. One or more centralizers 516 may be attached to the casing 512, for example, to centralize the casing 512 in the wellbore 505 prior to and during the cementing operation.

With continued reference to FIG. 3, a first spacer fluid 518 may be pumped down the interior of the casing 512. The first spacer fluid 518 may be allowed to flow down the interior of the casing 512 through the casing shoe 520 at the bottom of the casing 512 and up around the casing 512 into the wellbore annulus 514. After the first spacer fluid 518 has been pumped into the casing 512, cement slurry 420 may be pumped into the casing 512. In a manner similar to pumping the first spacer fluid 518, the cement slurry 420 may be allowed to flow down the interior of the casing 512 through the casing shoe 520 at the bottom of the casing 512 and up around the casing 512 into the wellbore annulus 514. After the cement slurry 420 has been pumped into the casing 512, a second spacer fluid 522 may be pumped into casing 512 and allowed to flow down the interior of the casing 512. The first spacer fluid 518 and the second spacer fluid 522 may be used to separate the cement slurry 420 from fluids introduced into the wellbore 505 either in front of or behind the cement slurry 420. Once the cement slurry 420 has been placed into the desired position in the wellbore annulus 514, the cement slurry 420 may be allowed to set in the wellbore annulus 514, for example, to form a hardened resin sheath that supports and positions the casing 512 in the wellbore 505. Alternatively, one or no spacer fluids may be used, and cement slurry 420 may not need to be separated from other fluids introduced previously or subsequently into wellbore 505. While not illustrated, other techniques may also be utilized for introduction of the cement slurry 420. By way of example, reverse circulation techniques may be used that include introducing the cement slurry 420 into the subterranean formation 500 by way of the wellbore annulus 514 instead of through the casing 512. These techniques may also utilize a first spacer fluid 518 and a second spacer fluid 522, or they may utilize one or none spacer fluids. As it is introduced, the cement slurry 420 may displace the first spacer fluid 518. At least a portion of the first spacer fluid 518 may exit the wellbore annulus 514 via a flow line 38 and be deposited, for example, in one or more mud pits 440, as shown on FIG. 2.

Figure 4:
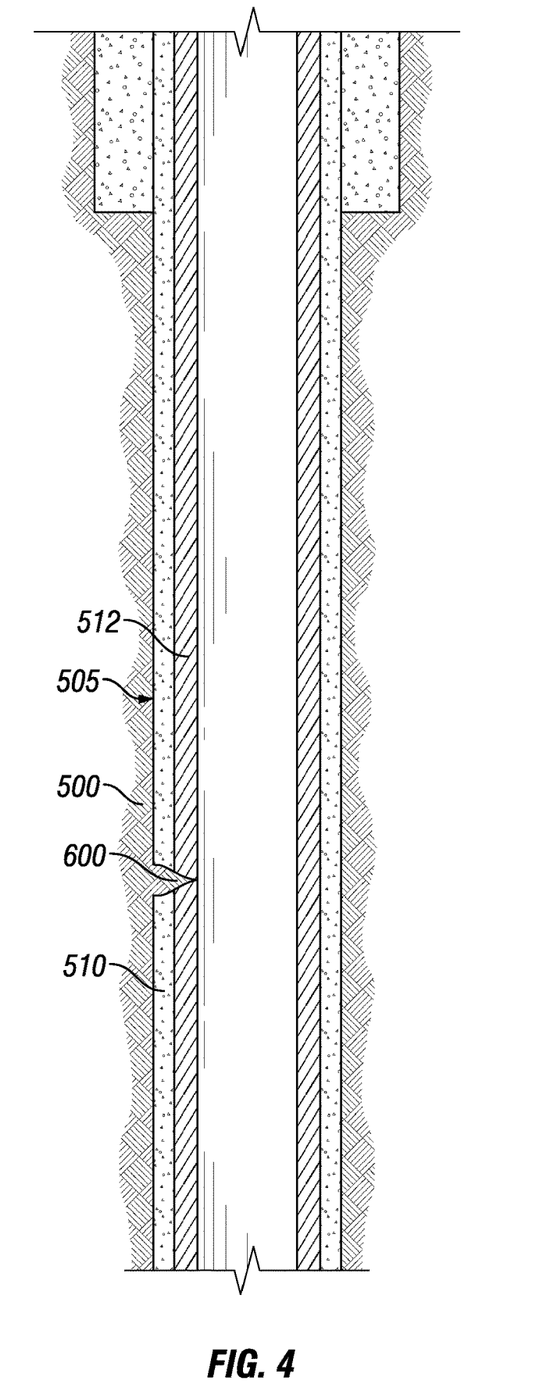
FIG. 4 is a schematic illustration showing the presence of a small perforation in a casing and cement sheath in a wellbore.
Figure 5:
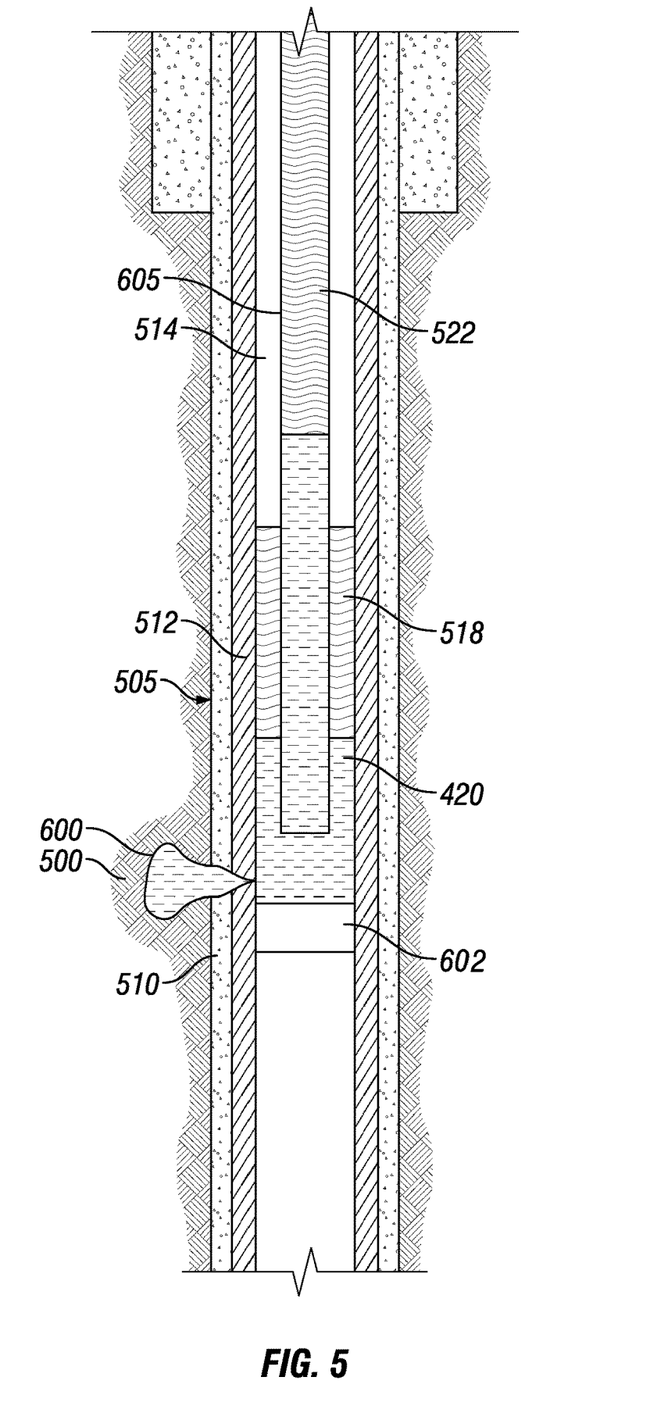
FIG. 5 is a schematic illustration of an example in which a cement slurry is used in a remedial cementing application.
Figure 6:
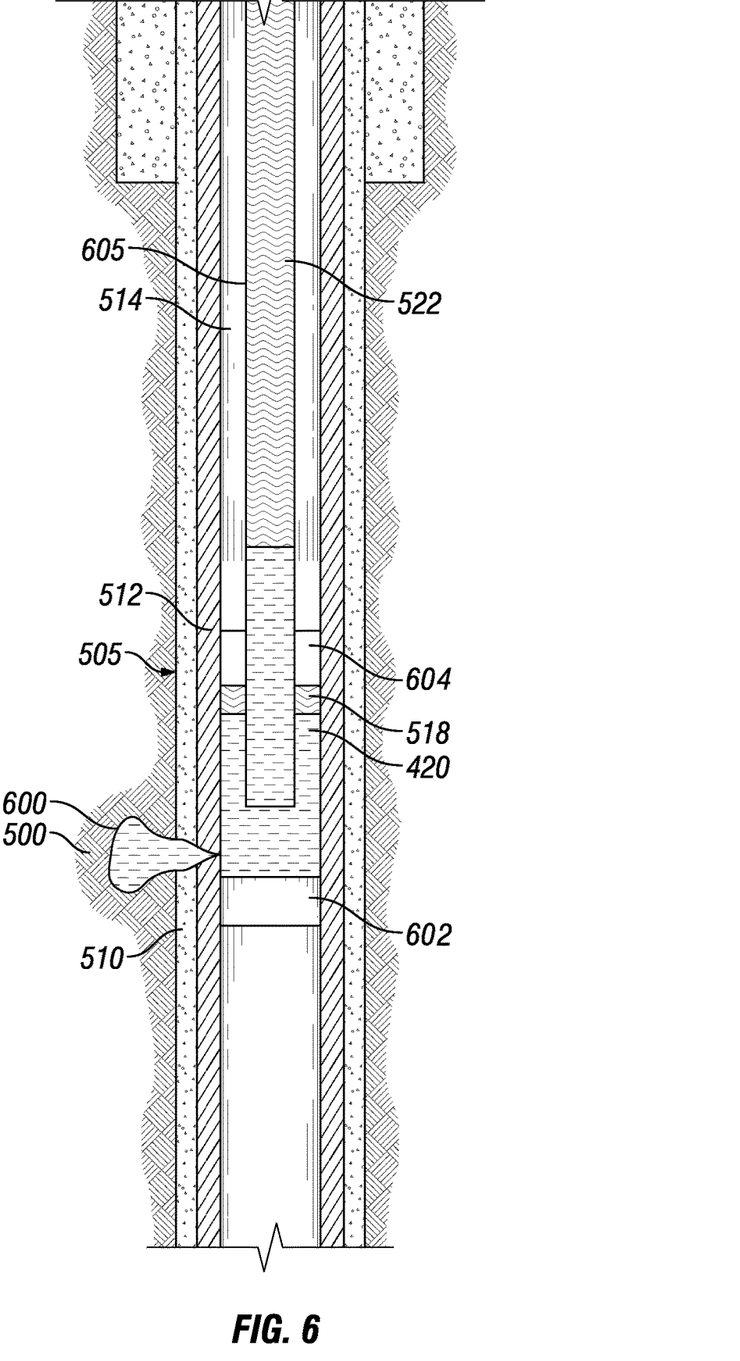
FIG. 6 is a schematic illustration of another example in which a cement slurry is used in a remedial cementing application.

FIGS. 4-6 illustrate methods of remedial or secondary cementing. Turning now to FIG. 4, there is shown a partial cross-section of a conventional producing wellbore 505 that has a primary cemented casing 512. The cement sheath 510 around the casing 512 may have defects potentially caused by a variety of issues, such as improper curing of the cement sheath 510 while it was being formed. Alternatively, the primary cementing may have been successful, but due to adverse temperatures and pressures within the subterranean formation 500, the casing 512 and/or the cement sheath 510 surrounding the casing 512 may form cracks or other types of small perforations 600. The small perforations 600 may be problematic since they may facilitate the introduction of undesirable fluids into the casing 512. As shown in FIG. 4, a small perforation 600 has formed in the cement sheath 510 and the casing 512, potentially allowing the introduction of undesirable fluids into the interior of the casing 512.

Referring now to FIG. 5, a small perforation 600 may be filled or plugged by a cement slurry 420 or a resin-cement composite. A plug 602 (the plug 602 may be any type of plug, e.g., bridge plug, etc.) may be initially placed adjacent and below the small perforation 600, to form a barrier to prevent cement slurry 420 from flowing down the wellbore 505 and therefore allow cement slurry 420 of the present disclosure to fill the small perforations 600 in the casing 512 and cement sheath 510. As shown in FIG. 5, tubing 605 (e.g., coiled tubing, drill pipe, etc.) may be lowered into wellbore 505. A first spacer fluid 518 may be pumped into the wellbore 505 via the tubing 605 and allowed to flow down the interior of the tubing 605 and into the blocked section of the wellbore 505 created by the plug 602. A portion of the first spacer fluid 518 may then flow through the small perforation 600 while another portion may reside in the annulus 514. After pumping the first spacer fluid 518 through the tubing 605, the cement slurry 420 may be pumped through the tubing 605. The cement slurry 420 may be pumped down the interior of the tubing 605 and into the blocked section of the wellbore 505 created by the plug 602. A portion of the cement slurry 420 may then flow through the small perforation 600 while another portion may reside in the annulus 514. The cement slurry 420 may be allowed to set in the small perforation 600 and in a portion of the wellbore annulus 514, for example, to form a hardened mass that seals small perforation 600 to prevent the migration of undesirable fluids into the interior of the casing 512. After the cement slurry 420 has been pumped into the tubing 605, a second spacer fluid 522 may be pumped into the tubing 605 and allowed to flow down the interior of the tubing 605 into the blocked section of the wellbore 505 created by the plug 602 and up around the tubing 605 into the wellbore annulus 514. Alternatively, one or no spacer fluids may be used, and cement slurry 420 may not need to be separated from other fluids introduced previously or subsequently into wellbore 505. The tubing 605 may then be removed. The plug 602 may also be removed. In alternative examples, plug 602 may remain in the wellbore 505 and be drilled through. After tubing 605 is removed, the portion of the hardened cement slurry 420 remaining in the wellbore 505 (i.e., the portion not in the small perforation 600) may then be drilled through.

FIG. 6 describes another example of filling a small perforation 600 with a cement slurry 420. A plug 602 (the plug 602 may be any type of plug, e.g., bridge plug, etc.) may be initially placed adjacent and below the small perforation 600, to form a barrier that may allow pressurized pumping of a cement slurry 420 of the present disclosure to fill any small perforations 600 in the casing 512 and cement sheath 510. As shown in FIG. 6, tubing 605 (e.g., coiled tubing, drill pipe, etc.) may be lowered into wellbore 505. Tubing 605 may be attached to a retainer 604 or may be inserted into a retainer 604 already placed into the wellbore 505. Retainer 604 may allow for the pressurized pumping of the cement slurry 420 into any small perforations 600. Retainer 604 must be placed adjacent to and above the small perforations 600 to be filled by cement slurry 420. Retainer 604 may be any type of retainer, for example, a cement retainer. After plug 602, tubing 605, and retainer 604 are placed, a first spacer fluid 518 may be pumped into the wellbore 505 via the tubing 605 and allowed to flow down the interior of the tubing 605 and into the blocked section of the wellbore 505 created by the plug 602. A portion of the first spacer fluid 518 may then flow through the small perforation 600. After pumping the first spacer fluid 518 through the tubing 605, the cement slurry 420 may be pumped through the tubing 605. The cement slurry 420 may be pumped down the interior of the tubing 605 and into the blocked section of the wellbore 505 created by the plug 602. A portion of the cement slurry 420 may then flow through the small perforation 600 while another portion may reside in the space formed between the plug 602 and retainer 604. The cement slurry 420 may be allowed to set in the small perforation 600 and in the space formed between the plug 602 and retainer 604. The cement slurry 420 may then harden to form a hardened mass that seals small perforation 600 to prevent the migration of undesirable fluids into the interior of the casing 512. After the cement slurry 420 has been pumped into the tubing 605, a second spacer fluid 522 may be pumped into the tubing 605 and allowed to flow down the interior of the tubing 605 into the blocked section of the wellbore 505 created by the plug 602 and into the space formed between the plug 602 and retainer 604. Alternatively, one or no spacer fluids may be used, and cement slurry 420 may not need to be separated from other fluids introduced previously or subsequently into wellbore 505. The tubing 605 may then be removed. The plug 602 may also be removed. In alternative examples, plug 602 may remain in the wellbore 505 and be drilled through. Retainer 604 may also be removed. Conversely, in alternative examples, retainer 604 may be drilled through. After tubing 605 is removed, the portion of the hardened cement slurry 420 remaining in the wellbore 505 (i.e., the portion not in the small perforation 600) may then be drilled through.

Figure 7:
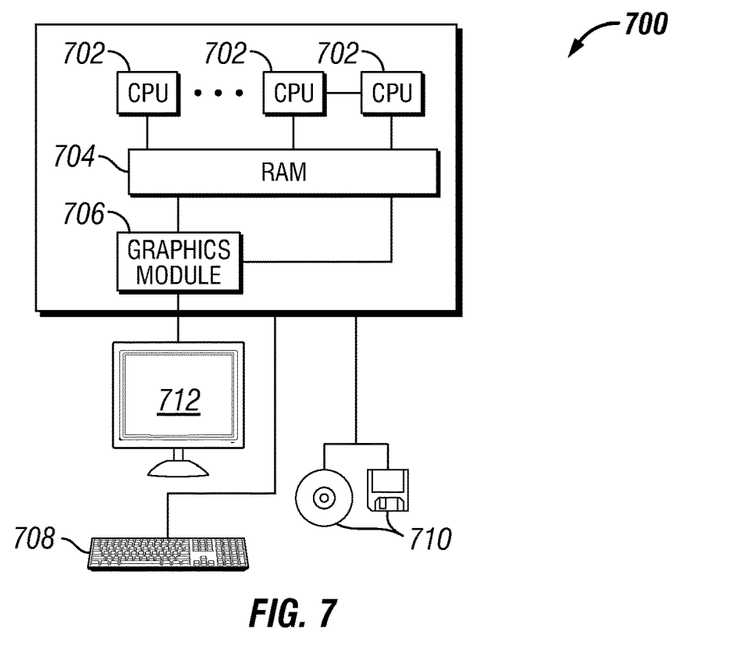
FIG. 7 is a schematic illustration of an example of an information handling system.

FIG. 7 generally illustrates an example of an information handling system 700 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 700 may be a personal computer, a network storage device, or any other suitable device and may vary in size, shape, performance, functionality, and price. In examples, information handling system 700 may be referred to as a supercomputer or a graphics supercomputer.

As illustrated, information handling system 700 may include one or more central processing units (CPU) or processors 702. Information handling system 700 may also include a random-access memory (RAM) 704 that may be accessed by processors 702. It should be noted information handling system 700 may further include hardware or software logic, ROM, and/or any other type of nonvolatile memory. Information handling system 700 may include one or more graphics modules 706 that may access RAM 704. Graphics modules 706 may execute the functions carried out by a Graphics Processing Module (not illustrated), using hardware (such as specialized graphics processors) or a combination of hardware and software. A user input device 708 may allow a user to control and input information to information handling system 700. Additional components of the information handling system 700 may include one or more disk drives, output devices 712, such as a video display, and one or more network ports for communication with external devices as well as a user input device 708 (e.g., keyboard, mouse, etc.). Information handling system 700 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media 710 such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 8:
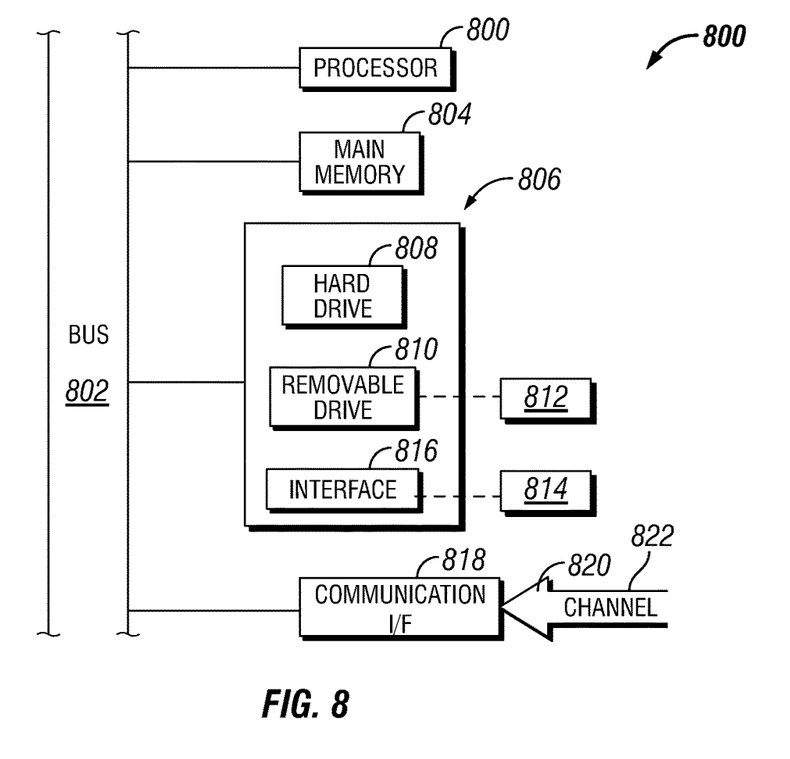
FIG. 8 illustrates additional detail of an information handling system.

FIG. 8 illustrates additional detail of information handling system 700. For example, information handling system 700 may include one or more processors, such as processor 800. Processor 800 may be connected to a communication bus 802. Various software embodiments are described in terms of this exemplary computer system. After reading this description, it will become apparent to a person skilled in the relevant art how to implement the example embodiments using other computer systems and/or computer architectures.

Information handling system 700 may also include a main memory 804, preferably random-access memory (RAM), and may also include a secondary memory 806. Secondary memory 806 may include, for example, a hard disk drive 808 and/or a removable storage drive 810, representing a floppy disk drive, a magnetic tape drive, an optical disk drive, etc. Removable storage drive 810 may read from and/or writes to a removable storage unit 812 in any suitable manner. Removable storage unit 812, represents a floppy disk, magnetic tape, optical disk, etc. which is read by and written to by removable storage drive 810. As will be appreciated, removable storage unit 812 includes a computer usable storage medium having stored therein computer software and/or data.

In alternative embodiments, secondary memory 806 may include other operations for allowing computer programs or other instructions to be loaded into information handling system 700. For example, a removable storage unit 814 and an interface 816. Examples of such may include a program cartridge and cartridge interface (such as that found in video game devices), a removable memory chip (such as an EPROM, or PROM) and associated socket, and other removable storage units 814 and interfaces 816 which may allow software and data to be transferred from removable storage unit 814 to information handling system 700.

In examples, information handling system 700 may also include a communications interface 818. Communications interface 818 may allow software and data to be transferred between information handling system 700 and external devices. Examples of communications interface 818 may include a modem, a network interface (such as an Ethernet card), a communications port, a PCMCIA slot and card, etc. Software and data transferred via communications interface 818 are in the form of signals 820 that may be electronic, electromagnetic, optical or other signals capable of being received by communications interface 818. Signals 820 may be provided to communications interface via a channel 822. Channel 822 carries signals 820 and may be implemented using wire or cable, fiber optics, a phone line, a cellular phone link, an RF link and/or any other suitable communications channels. For example, information handling system 700 includes at least one memory 804 operable to store computer-executable instructions, at least one communications interface 802, 818 to access the at least one memory

804; and at least one processor 800 configured to access the at least one memory 804 via the at least one communications interface 802, 818 and execute computer-executable instructions.

In this document, the terms "computer program medium" and "computer usable medium" are used to generally refer to media such as removable storage unit 812, a hard disk installed in hard disk drive 808, and signals 820. These computer program products may provide software to computer system 700.

Computer programs (also called computer control logic) may be stored in main memory 804 and/or secondary memory 806. Computer programs may also be received via communications interface 818. Such computer programs, when executed, enable information handling system 700 to perform the features of the example embodiments as discussed herein. In particular, the computer programs, when executed, enable processor 800 to perform the features of the example embodiments. Accordingly, such computer programs represent controllers of information handling system 700.

In examples with software implementation, the software may be stored in a computer program product and loaded into information handling system 700 using removable storage drive 810, hard disk drive 808 or communications interface 818. The control logic (software), when executed by processor 800, causes processor 800 to perform the functions of the example embodiments as described herein.

In examples with hardware implementation, hardware components such as application specific integrated circuits (ASICs). Implementation of such a hardware state machine so as to perform the functions described herein will be apparent to persons skilled in the relevant art(s). It should be noted that the disclosure may be implemented at least partially on both hardware and software.

The methods described herein may be carried out, at least in part, using a computer system including a computer-accessible medium, the computer-accessible medium containing a computer program that causes a processor to execute instructions that carry out at least some of the method steps described herein. In general, a computer-accessible medium may include any tangible or non-transitory storage media or memory media such as electronic, magnetic, or optical media—e.g., disk or CD/DVD-ROM coupled to the computer. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM), flash memory, or other volatile memory types. Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Accordingly, this disclosure describes systems, compositions, and methods relating to slurry design process. Without limitation, the systems, compositions and methods may further be characterized by one or more of the following statements:

Statement 1. A method of determining slurry mixability comprising: providing a dry blend comprising one or more particulate materials; calculating a minimum water requirement of the dry blend; calculating a water requirement of a slurry having a target slurry density and comprising the dry blend; determining if the slurry is mixable based on the water requirement of the slurry and the minimum water requirement; and preparing the slurry if the slurry is mixable.

Statement 2. The method of statement 1, further comprising at least one of measuring a water requirement for the one or more particulate materials and providing a water requirement for the one or more particulate materials.

Statement 3. The method of any of statements 1-2, wherein the step of calculating the minimum water requirement of the composition comprises calculating a water requirement by a linear combination of water requirements of the one or more particulate materials or a non-linear combination of water requirements of the one or more particulate materials.

Statement 4. The method of any of statements 1-3, wherein the step of calculating the minimum water requirement of the composition comprises calculating a linear combination with the following formula: $WR_{Blend} = \Sigma M_i WR_i$ where $WR_{blend}$ is the minimum water requirement, Mi is the mass fraction or mass of particulate material i of the composition, and $WR_i$ is the water requirement of particulate material i of the composition.

Statement 5 The method of any of statements 1-4, wherein the step of calculating the minimum water requirement of the composition comprises calculating a non-linear combination with the following formula: $WR_{Blend} = \Sigma (M_i WR_i)^{B_i}$ where $WR_{blend}$ is the minimum water requirement, Mi is the mass fraction or mass of particulate material i of the composition, and $WR_i$ is the water requirement of particulate material i of the composition, and $B_i$ is a material constant for particulate material i of the composition.

Statement 6. The method of any of statements 1-5, wherein the step of calculating the water requirement of the slurry is performed with the following formula:

$$\rho_{slurry} = \frac{1 + WRslurry}{\Sigma(1 * M_i v_i) + WRslurry}$$

where $\rho_{slurry}$ is the target slurry density, $M_i$ is the mass fraction of particulate material i in the composition, $v_i$ is a specific volume of particulate material i in the composition, and $WR_{slurry}$ is the water requirement of the cement slurry.

Statement 7. The method of any of statements 1-6: further including performing at least one of adjusting a mass fraction of at least one the particulate materials of the composition, adding one or more additional particulate materials to the composition, adding a dispersant to the composition, adding a suspension additive to the composition, or adding a free water additive to the composition.

Statement 8. A method of wellbore cementing comprising: providing a dry blend of one or more of one or more particulate materials, wherein the one or more particulate materials comprises at least one cementitious material; calculating a minimum water requirement of the dry blend; calculating a water requirement of a slurry having a target slurry density and comprising the dry blend; determining if the slurry is mixable based on the water requirement of the slurry and the minimum water requirement; preparing the slurry if the slurry is mixable; and pumping the slurry into a well bore.

Statement 9. The method of statement 8, further comprising at least one of measuring a water requirement for the one or more particulate materials and providing a water requirement for the one or more particulate materials.

Statement 10. The method of any of statements 8-9, wherein the step of calculating the minimum water requirement of the cement composition comprises calculating a water requirement by a linear combination of water requirements of the one or more particulate materials or a non-linear combination of water requirements of the one or more particulate materials.

Statement 11. The method of any of statements 8-10, wherein the step of calculating the minimum water requirement of the cement composition comprises calculating a linear combination with the following formula: $WR_{Blend}=\Sigma M_i WR_i$ where $WR_{blend}$ is the minimum water requirement, Mi is the mass fraction or mass of particulate material i of the cement composition, and $WR_i$ is the water requirement of particulate material i of the cement composition.

Statement 12. The method of any of statements 8-11, wherein the step of calculating the minimum water requirement of the cement composition comprises calculating a non-linear combination with the following formula: $WR_{Blend}=\Sigma(M_i WR_i)^{B_i}$ where $WR_{blend}$ is the minimum water requirement, Mi is the mass fraction or mass of particulate material i of the cement composition, and $WR_i$ is the water requirement of particulate material i of the cement composition, and $B_i$ is a material constant for particulate material i of the cement composition.

Statement 13. The method of any of statements 8-12, wherein the step of calculating the water requirement of the slurry is performed with the following formula:

$$\rho_{slurry} = \frac{1 + WRslurry}{\Sigma(1 * M_i v_i) + WRslurry}$$

where $\rho_{slurry}$ is the target slurry density, $M_i$ is the mass fraction of particulate material i in the composition, $v_i$ is a specific volume of particulate material i in the composition, and $WR_{slurry}$ is the water requirement of the cement slurry.

Statement 14. The method of any of statements 8-13 further comprising: performing at least one of adjusting a mass fraction of at least one the particulate materials of the composition, adding one or more additional particulate materials to the composition, adding a dispersant to the composition, adding a suspension additive to the composition, or adding a free water additive to the composition.

Statement 15. A non-transitory computer readable medium having data stored therein representing software executable by a computer, the software including instructions comprising: instructions to calculate a minimum water requirement of a dry blend comprising one or more particulate materials; instructions to calculate a water requirement of a slurry based on the dry blend and the target slurry density; and instructions to determine if the slurry is mixable based on the water requirement of the composition and the minimum water requirement of the composition.

Statement 16. The non-transitory computer readable medium of statement 15, wherein calculating the minimum water requirement of the composition comprises calculating a linear combination with the following formula: $WR_{Blend}=M_i WR_i$ where $WR_{blend}$ is the minimum water requirement, Mi is the mass fraction or mass of particulate material i of the composition, and $WR_i$ is a water requirement of particulate material i of the composition.

Statement 17. The non-transitory computer readable medium of any of statements 15-17, wherein calculating the minimum water requirement of the cement composition comprises calculating a non-linear combination with the following formula: $WR_{Blend}=\Sigma(M_i WR_i)^{B_i}$ where $WR_{blend}$ is the minimum water requirement, Mi is the mass fraction or mass of particulate material i of the composition, and $WR_i$ is a water requirement of particulate material i of the composition, and $B_i$ is a material constant for particulate material i of the composition.

Statement 18. The non-transitory computer readable medium of any of statements 15-17, wherein calculating the water requirement of the slurry is performed with the following formula:

$$\rho_{slurry} = \frac{1 + WRslurry}{\Sigma(1 * M_i v_i) + WRslurry}$$

where $\rho_{slurry}$ is the target slurry density, $M_i$ is the mass fraction of particulate material i in the composition, $v_i$ is a specific volume of particulate material i in the composition, and $WR_{slurry}$ is the water requirement of the cement slurry.

Statement 19. The non-transitory computer readable medium of any of statements 15-18, wherein the instructions further comprise: instructions to query a database and accept a water requirement for at least one of the one or more particulate materials.

Statement 20. The non-transitory computer readable medium of claim 15, wherein the instructions further comprise: instructions to perform at least one of adjusting a mass fraction of at least one the particulate materials of the composition, adding one or more additional particulate materials to the composition, adding a dispersant to the composition, adding a suspension additive to the composition, or adding a free water additive to the composition to produce a modified composition; instructions calculate a minimum water requirement of the modified composition; instructions calculate a water requirement of a modified slurry based on the modified composition and the target slurry density; instructions determine if the modified slurry is mixable based on the water requirement of the modified composition and the minimum water requirement of the modified composition; and instructions to output information from the step of determining if the modified slurry is mixable.

The disclosed cement slurries and associated methods may directly or indirectly affect any pumping systems, which representatively includes any conduits, pipelines, trucks, tubulars, and/or pipes which may be coupled to the pump and/or any pumping systems and may be used to fluidically convey the cement slurries downhole, any pumps, compressors, or motors (e.g., topside or downhole) used to drive the cement slurries into motion, any valves or related joints used to regulate the pressure or flow rate of the cement slurries, and any sensors (i.e., pressure, temperature, flow rate, etc.), gauges, and/or combinations thereof, and the like. The cement slurries may also directly or indirectly affect any mixing hoppers and retention pits and their assorted variations.

It should be understood that the slurries and methods are described in terms of "comprising," "containing," or "including" various components or steps, the slurries and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present invention may be modified and practiced in different but equivalent manners apparent to those skilled in the art having the benefit of the teachings herein. Although individual examples are discussed, the invention covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of determining slurry mixability comprising:
providing a dry blend comprising one or more particulate materials comprising dissolvable and undissolvable particulate materials;
calculating a minimum water requirement for the dissolvable and undissolvable particulate materials by a linear combination of water requirements for the dissolvable and undissolvable particulate materials or a non-linear combination of water requirements for the dissolvable and undissolvable particulate materials;
calculating a water requirement of a slurry having a target slurry density and comprising the dry blend;
determining if the slurry is mixable based on the water requirement of the slurry, the minimum water requirement, and a maximum water requirement to form the slurry; and
preparing the slurry if the slurry is mixable.

2. The method of claim 1, further comprising measuring a water requirement for the dissolvable and undissolvable.

3. The method of claim 1, further comprising including a dispersant, a suspension additive, or a free water additive in the slurry based on a comparison between the maximum water requirement for the slurry, the water requirement for the slurry, and the minimum water requirement for the dry blend.

4. The method of claim 1, wherein the step of calculating the minimum water requirement of the composition comprises calculating a linear combination with the following formula:

$$WR_{Blend} = \Sigma M_i WR_i$$

where $WR_{blend}$ is the minimum water requirement, $M_i$ is the mass fraction or mass of particulate material i of the composition, and $WR_i$ is the water requirement of particulate material i of the composition.

5. The method of claim 1, wherein the step of calculating the minimum water requirement of the composition comprises calculating a non-linear combination with the following formula:

$$WR_{Blend} = \Sigma (M_i WR_i)^{B_i}$$

where $WR_{blend}$ is the minimum water requirement, $M_i$ is the mass fraction or mass of particulate material i of the composition, and $WR_i$ is the water requirement of particulate material i of the composition, and $B_i$ is a material constant for particulate material i of the composition.

6. The method of claim 1, wherein the step of calculating the water requirement of the slurry is performed with the following formula:

$$\rho_{slurry} = \frac{1 + WRslurry}{\Sigma(1 * M_i v_i) + WRslurry}$$

where $\rho_{slurry}$ is the target slurry density, $M_i$ is the mass fraction of particulate material i in the composition, $v_i$ is a specific volume of particulate material i in the composition, and $WR_{slurry}$ is the water requirement of the cement slurry.

7. The method of claim 1 further comprising:
performing at least one of adjusting a mass fraction of at least one the particulate materials of the composition, adding one or more additional particulate materials to the composition, adding a dispersant to the composition, adding a suspension additive to the composition, or adding a free water additive to the composition.

8. A method of wellbore cementing comprising:
providing a dry blend of one or more of one or more particulate materials, wherein the one or more particulate materials comprises dissolvable and undissolvable particulate materials, at least the dissolvable particulate material or the undissolvable particulate material including at least one cementitious material;
calculating a minimum water requirement of the dry blend by a linear combination of water requirements for the dissolvable and undissolvable particulate materials or a non-linear combination of water requirements for the dissolvable and undissolvable particulate materials;
calculating a water requirement of a slurry having a target slurry density and comprising the dry blend;
determining if the slurry is mixable based on the water requirement of the slurry, the minimum water requirement, and a maximum water requirement to form the slurry;
preparing the slurry if the slurry is mixable;

and
pumping the slurry into a wellbore.

9. The method of claim 8, further comprising measuring a water requirement for the dissolvable and undissolvable particulate materials.

10. The method of claim 8, further comprising including a dispersant, a suspension additive, or a free water additive in the slurry based on a comparison between the maximum water requirement for the slurry, the water requirement for the slurry, and the minimum water requirement for the dry blend.

11. The method of claim 8, wherein the step of calculating the minimum water requirement of the cement composition comprises calculating a linear combination with the following formula:

$$WR_{Blend} = \Sigma M_i WR_i$$

where $WR_{blend}$ is the minimum water requirement, $M_i$ is the mass fraction or mass of particulate material i of the cement composition, and $WR_i$ is the water requirement of particulate material i of the cement composition.

12. The method of claim 8, wherein the step of calculating the minimum water requirement of the cement composition comprises calculating a non-linear combination with the following formula:

$$WR_{Blend} = \Sigma (M_i WR_i)^{B_i}$$

where $WR_{blend}$ is the minimum water requirement, $M_i$ is the mass fraction or mass of particulate material i of the cement composition, and $WR_i$ is the water requirement of particulate material i of the cement composition, and $B_i$ is a material constant for particulate material i of the cement composition.

13. The method of claim 8, wherein the step of calculating the water requirement of the slurry is performed with the following formula:

$$\rho_{slurry} = \frac{1 + WRslurry}{\Sigma(1 * M_i v_i) + WRslurry}$$

where $\rho_{slurry}$ is the target slurry density, $M_i$ is the mass fraction of particulate material i in the composition, $v_i$ is a specific volume of particulate material i in the composition, and $WR_{slurry}$ is the water requirement of the cement slurry.

14. The method of claim 8 further comprising:
performing at least one of adjusting a mass fraction of at least one the particulate materials of the composition, adding one or more additional particulate materials to the composition, adding a dispersant to the composition, adding a suspension additive to the composition, or adding a free water additive to the composition.

15. A non-transitory computer readable medium having data stored therein representing software executable by a computer, the software including instructions comprising:
instructions to calculate a minimum water requirement of a dry blend comprising one or more particulate materials comprising dissolvable and undissolvable particulate materials by a linear combination of water requirements for the dissolvable and undissolvable particulate materials or a non-linear combination of water requirements for the dissolvable and undissolvable one or more particulate materials;
instructions to calculate a water requirement of a slurry based on the dry blend and the target slurry density; and
instructions to determine if the slurry is mixable based on the water requirement of the composition, the minimum water requirement of the composition, and a maximum water requirement to form the slurry.

16. The non-transitory computer readable medium of claim 15, wherein calculating the minimum water requirement of the composition comprises calculating a linear combination with the following formula:

$$WR_{Blend} = \Sigma M_i WR_i$$

where $WR_{blend}$ is the minimum water requirement, $M_i$ is the mass fraction or mass of particulate material i of the composition, and $WR_i$ is a water requirement of particulate material i of the composition.

17. The non-transitory computer readable medium of claim 15, wherein calculating the minimum water requirement of the cement composition comprises calculating a non-linear combination with the following formula:

$$WR_{Blend} = \Sigma (M_i WR_i)^{B_i}$$

where $WR_{blend}$ is the minimum water requirement, $M_i$ is the mass fraction or mass of particulate material i of the composition, and $WR_i$ is a water requirement of particulate material i of the composition, and $B_i$ is a material constant for particulate material i of the composition.

18. The non-transitory computer readable medium of claim 15, wherein calculating the water requirement of the slurry is performed with the following formula:

$$\rho_{slurry} = \frac{1 + WRslurry}{\Sigma(1 * M_i v_i) + WRslurry}$$

where $\rho_{slurry}$ is the target slurry density, $M_i$ is the mass fraction of particulate material i in the composition, $v_i$ is a specific volume of particulate material i in the composition, and $WR_{slurry}$ is the water requirement of the cement slurry.

19. The non-transitory computer readable medium of claim 15, wherein the instructions further comprise:
instructions to query a database and accept a water requirement for at least one of the one or more particulate materials.

20. The non-transitory computer readable medium of claim 15, wherein the instructions further comprise:
instructions to perform at least one of adjusting a mass fraction of at least one the particulate materials of the composition, adding one or more additional particulate materials to the composition, adding a dispersant to the composition, adding a suspension additive to the composition, or adding a free water additive to the composition to produce a modified composition;
instructions to calculate a minimum water requirement of the modified composition;
instructions to calculate a water requirement of a modified slurry based on the modified composition and the target slurry density;
instructions to determine if the modified slurry is mixable based on the water requirement of the modified composition and the minimum water requirement of the modified composition; and
instructions to output information from the step of determining if the modified slurry is mixable.

* * * * *

UNITED STATES PATENT AND TRADEMARK OFFICE
CERTIFICATE OF CORRECTION

| | |
|---|---|
| PATENT NO. | : 11,352,300 B2 |
| APPLICATION NO. | : 16/633386 |
| DATED | : June 7, 2022 |
| INVENTOR(S) | : John Paul Bir Singh, Thomas Jason Pisklak and Ronnie Glen Morgan |

It is certified that error appears in the above-identified patent and that said Letters Patent is hereby corrected as shown below:

In the Claims

In Claim 2 (Column 21, Line 67), replace "dissolvable and undissolvable" with "dissolvable and undissolvable particulate materials."

Signed and Sealed this
Second Day of August, 2022

Katherine Kelly Vidal
*Director of the United States Patent and Trademark Office*